Patented May 24, 1938

2,118,143

UNITED STATES PATENT OFFICE 2,118,143

REFRACTORY MATERIAL

Raymond C. Benner and Henry N. Baumann, Jr., Niagara Falls, N. Y., assignors, by mesne assignments, to The Carborundum Company, Niagara Falls, N. Y., a corporation of Delaware No Drawing. Application April 25, 1935, Serial No. 18,213

7 Claims. (Cl. 106—9)

This invention relates to a new refractory material and a method of making the same. More particularly the invention relates to a new refractory material comprising a substantial proportion of boro-aluminate included in a fused mixture of boric oxide and aluminum oxide.

In connection with this invention it has been discovered that fusions of boric oxide and aluminum oxide may be made, preferably in an electric furnace, having remarkable refractory and insulating qualities, being distinguished by high melting points, high electrical resistance, low thermal conductivity, and low thermal expansion.

In its preferred form, the new refractory material should contain a substantial proportion of crystalline boro-aluminate, which is a material having the formula $$3Al_2O_3.B_2O_3$$

This formula represents a proportion by weight of approximately 20% of boric oxide and in preparing the new material when it is desired that it shall be substantially pure, the ratio of the ingredients in the mix should be approximately 80% aluminum oxide and 20% boric oxide.

However, depending upon the particular use to which the material is to be put, it may be desirable to use different proportions. For example, a mix may be made to contain 35% boric oxide and the rest aluminum oxide. The fused material prepared from such a mix consists chiefly of the crystalline boro-aluminate and a glassy matrix containing chiefly boric oxide and possibly some alumina in solution.

The mix from which the material is to be prepared may contain less than 20% boric oxide whereby the fused material will be found to contain corundum as well as the boro-aluminate. For example, a mix containing 10% boric oxide and the remainder aluminum oxide, results in a fused material containing corundum as a crystalline phase as well as the crystalline boro-aluminate.

The new refractory material may be prepared in an electric furnace of the pot type in which vertical carbon electrodes depend into a molten bath of the ingredients of the mix. The ingredients are thoroughly mixed and fed slowly between the electrodes of the furnace. The voltage required by the furnace varies with the size of the electrodes, their depth and the distance between them, as is well known in the art of making electric furnace fusions of refractory oxides. It may be said however, that the applied voltage necessary is at least twice as great as would be necessary to melt alumina or other aluminates under similar conditions. After fusion the electrodes may be withdrawn and the molten mass then allowed to cool in place.

The molten material may also be cast directly into desired shapes by tapping or tilting the furnace and pouring the fused material into refractory molds. The molten material has a relatively high viscosity so that it is desirable just before pouring to raise the temperature of the molten material, for example, by increasing the power input.

The material may be cooled slowly for which purpose the mould should be well insulated or cooled in a furnace, or the cast material may be cooled quickly and later annealed by reheating the casting in a muffle type furnace.

The crystalline form of boro-aluminate may be distinguished by means of a petrographic microscope. It is a double refracting material crystallizing in long needles apparently belonging to the orthorhombic system and apparently is of the chemical formula $$3Al_2O_3.B_2O_3$$

The exact chemical composition of these crystals is not important as the proportions of the ingredients can be varied considerably without obtaining any other crystalline phase of a boro-aluminate. When the proportion of boric oxide is increased above 20%, the fused material contains, in addition to the boro-aluminate in the crystalline form, an intercrystalline glass. When the proportion of boric oxide is decreased below 20%, the crystals of boro-aluminate will be found to be mixed with more or less corundum, depending upon the amount of excess aluminum oxide.

The refractory and ceramic properties of the material are fairly constant within reasonably wide composition limits, in which the boric oxide may be as low as 10% or as high as 35%, the remainder being aluminum oxide.

In the preparation of a material for use as ceramic raw materials, cheaper sources of boric oxide may be used. For example, part of the anhydrous boric oxide may be replaced with other boron oxide compounds such as dehydrated borax, or with boracite, or colemanite, where the use to which the product is to be put does not prohibit alkaline inclusions.

The new material may be used in granular form mixed with other oxides etc. or it may be formed in a fusion containing other oxides such as $SiO_2$ and/or $ZrO_2$, the stable crystalline phase being boro-aluminate.

The new boro-aluminate composition is characterized by remarkable refractoriness, low coefficient of expansion, low thermal conductivity, and low electrical conductivity, and in addition it is non-hygroscopic.

In the form of cast bricks or cast monolithic refractory shapes, the new material is extremely valuable as a refractory material. The material has a refractoriness comparable to that of alumina, showing no deformation up to 1500° C. when carrying a load of 25 pounds per sq. in. in the standard high temperature load test. At the same time, the cast material has a lower linear coefficient of expansion than cast alumina, the value for the material containing 20% boric oxide and 80% alumina being $4.2 \times 10^{-6}/°$ C. between room temperature and 1400° C. The material containing 10% boric oxide has a slightly higher, and the material containing 35% boric oxide a slightly lower, linear coefficient of expansion than the above value. In low value of thermal expansion the only crystalline silicate or aluminate that compares with the boro-aluminate is mullite and mullite is much more subject to failure by heat shock. In a car tunnel type of spalling test a cast boro-aluminate withstood four times as many heat shocks before failure as did cast mullite. In this car tunnel type of spalling test, standard nine inch brick are heated to 1200° C., and then subject to heat shock by quickly withdrawing the car on which the test brick are placed into the open, and repeating this process on a one hour cycle of heating and cooling.

As a refractory material the boro-aluminate also has the desirable property of a relatively low thermal conductivity, being comparable to mullite in this regard.

Due to the relatively high melting point of the material, its relatively low thermal conductivity, its relatively low thermal expansion, and its exceptional spall resistance, it is useful as a grain in the production of refractory porcelain. For example the following mixes (in which percentages shown are by weight) are suitable for the production of refractory porcelains using boro-aluminate as a principal ingredient.

|  | A | B |
|---|---|---|
|  | Percent | Percent |
| Boro-aluminate | 40 | 50 |
| Kaolin | 36 | 30 |
| Ball clay | 23 | 15 |
| Magnesium oxide | 1 |  |
| Feldspar |  | 5 |
|  | 100 | 100 |

The fused boro-aluminate has several times the electrical resistance of fused alumina, wherefore the new material is valuable for use as electrical insulating material. Specifically this property, in connection with its high melting point and non-hygroscopic nature, recommends it as a valuable ingredient in embedding cements for electrical heating elements. In such cements the boro-aluminate crushed to pass through a screen of perhaps 150 meshes to the inch is used with a suitable binder, such for example as 25% of a plastic clay.

In general it may be said that the new material with its unusual combination of valuable characteristics is useful as an ingredient in the production of a wide variety of materials whose use requires in them stability at high temperatures, indifference to sudden changes in temperature, high electrical resistance, and lack of hygroscopicity.

In the specification and claims wherever the word "refractory" is used it is intended to convey by its meaning articles for use at high temperatures, such as cast or bonded blocks for lining furnaces or glass tanks, embedding cements, and crucibles or laboratory ware for use at temperatures exceeding 1000° C.

We claim:

1. The method of making refractory material which comprises melting a mixture consisting of 10 to 35% boric oxide and 65 to 90% aluminum oxide, cooling the molten mixture and causing the formation of a substantial proportion of boro-aluminate crystals in the cooled body.

2. A fused cast refractory composed of alumina and boric oxide in the approximate ratio of 4:1 by weight and characterized by the presence of a substantial proportion of boro-aluminate crystals.

3. A solidified fused refractory body composed of alumina and boric oxide in the ratio of approximately 4:1 by weight, together with a small amount of an acid oxide of the group consisting of $SiO_2$ and $ZrO_2$, said fused mixture being further characterized by the presence of a substantial proportion of boro-aluminate crystals.

4. A furnace wall comprising castings of fused boro-aluminate, composed of boric oxide and alumina in the approximate ratio of 1:4 by weight.

5. As a new article of manufacture, a refractory body consisting of a solidified fusion of $Al_2O_3$ and $B_2O_3$ in which the $Al_2O_3$ content is from 65 to 90 and the $B_2O_3$ content from 35% to 10%, said body being further characterized by the presence of a substantial proportion of boro-aluminate crystals.

6. The method of making a refractory body which comprises forming a molten mixture containing from 65 to 90% $Al_2O_3$ and from 10 to 35% $B_2O_3$, casting the said mixture to form the desired shape and causing the formation of a substantial proportion of boro-aluminate crystals in the said casting.

7. As a new article of manufacture, a refractory body consisting substantially of a fusion product of $Al_2O_3$ and $B_2O_3$ in which the $Al_2O_3$ content is from 65 to 90 and the $B_2O_3$ content from 35% to 10%, together with a ceramic bond, said fusion product being further characterized by the presence of a substantial proportion of boro-aluminate crystals.

RAYMOND C. BENNER.
HENRY N. BAUMANN, Jr.